(12) United States Patent
Oka (10) Patent No.: US 8,270,087 B2
(45) Date of Patent: Sep. 18, 2012

(54) HEAD MOUNTED DISPLAY

(75) Inventor: Hidenori Oka, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 102 days.

(21) Appl. No.: 12/890,038

(22) Filed: Sep. 24, 2010

(65) Prior Publication Data

US 2011/0075266 A1 Mar. 31, 2011

(30) Foreign Application Priority Data

Sep. 28, 2009 (JP) ................. 2009-221962

(51) Int. Cl.
*G02B 27/14* (2006.01)
(52) U.S. Cl. ...................................... 359/630; 359/619
(58) Field of Classification Search .................. 359/630, 359/631
See application file for complete search history.

(56) References Cited

U.S. PATENT DOCUMENTS

| 6,219,188 B1 | 4/2001 | Tsukamoto |
| 2008/0180596 A1* | 7/2008 | Fujimoto ........................ 349/62 |

FOREIGN PATENT DOCUMENTS

| JP | A-11-249067 | 9/1999 |
| JP | A-2007-178941 | 7/2007 |
| JP | A-2009-128649 | 6/2009 |

* cited by examiner

*Primary Examiner* — James Jones
(74) *Attorney, Agent, or Firm* — Oliff & Berridge, PLC (57) ABSTRACT

In a half mirror of a head mounted display which is formed by stacking a dielectric film and a metal film to a plate-shaped resin member, reflectivity of a P-polarized light and reflectivity of an S-polarized light do not agree with each other in at least a partial band of a visible band which contains wavelengths of three primary colors which constitute the image light. On the other hand, the reflectivity of the P-polarized light and the reflectivity of the S-polarized light with respect to the three primary colors are set approximately equal. An average value of transmittance of the P-polarized light and transmittance of the S-polarized light with respect to the respective wavelengths in the visible band which contains the wavelengths of the three primary colors is suppressed to a value which falls within a regulated range in the whole visible band.

4 Claims, 5 Drawing Sheets

HEAD MOUNTED DISPLAY

CROSS-REFERENCE TO RELATED APPLICATIONS

This application is based on and claims the benefit of priority from Japanese Patent Application No. 2009-221962 filed on Sep. 28, 2009, the entire contents of which are incorporated herein by reference.

BACKGROUND

1. Field

The present invention relates to a head mounted display, and more particularly to a see-through-type head mounted display which displays an image corresponding to an image signal in a superposed manner with scenery.

2. Description of the Related Art

Recently, there has been developed a see-through-type head mounted display which is mounted on a user's head and includes a display part which displays an image corresponding to an image signal transmitted from a video, a personal computer or the like in a superposed manner with scenery.

As such kind of head mounted display (hereinafter, referred to as "HMD"), there has been known an HMD including a half mirror which allows image light and external light to be incident on an eye of a user by reflecting the image light thereon and by allowing the external light to pass therethrough for displaying the image in a superposed manner with scenery.

In a conventional HMD, for example, a half mirror is provided in front of one of user's eyes in an oblique posture with respect to the direction of a line of sight of the user. An image light which is radiated from a radiation device of the HMD is reflected on the half mirror and is projected on the eye of the user. On the other hand, an external light passes through the half mirror and is projected on the eye of the user. Accordingly, the user recognizes the image formed by the image light in a state where the image is superposed on the scenery.

SUMMARY OF THE INVENTION

The conventional half mirror is constituted such that a reflection film is formed on a glass substrate and hence, the half mirror is liable to be broken when it falls. Particularly, the half mirror is arranged in front of the eye of the user and hence, the half mirror formed of the glass substrate and the reflection film is not desirable from a viewpoint of safety.

In view of the above, the use of a resin substrate instead of the glass substrate has been considered. However, due to a reason set forth below, it is difficult for the resin substrate to acquire optical characteristics approximately equal to optical characteristics of the glass substrate.

The half mirror is formed by applying a reflection film to a transparent substrate by coating. As such a reflection film, a dielectric film or a metal film is named.

The metal film exhibits large absorption (loss) of light and hence, the preparation of the half mirror by applying only the metal film to the transparent substrate by coating has a following drawback. That is, in an attempt to increase the reflectivity of the half mirror with respect to the image light using only the metal film, it is difficult for the half mirror to acquire the sufficient transmittance so that the scenery becomes dark. To the contrary, in an attempt to increase the transmittance of the half mirror with respect to the image light using only the metal film, it is difficult for the half mirror to acquire the sufficient reflectivity so that the loss of the image light is increased.

Further, the dielectric film exhibits high wavelength dependency although the dielectric film exhibits small absorption (loss) of light. Accordingly, in an attempt to prepare the half mirror by applying only the dielectric film to the transparent substrate by coating, it is difficult for the half mirror to acquire the flat transmission characteristic and the flat reflection characteristic in a visible band.

Accordingly, in a half mirror used in a see-through-type HMD, a metal film and a dielectric film are stacked to a transparent substrate. That is, the half mirror is formed by applying a hybrid film which is the combination of the metal film and the dielectric film to a glass substrate by coating.

In such a half mirror which uses the glass substrate to which the hybrid film is applied by coating, it is possible to realize the flat reflection characteristic and the flat transmission characteristic with respect to light in a visible band. However, the resin substrate exhibits poor heat resistance compared to the glass substrate. Accordingly, it is difficult to apply the metal film to the resin substrate by coating so that it is necessary to increase a film thickness of the dielectric film. In this case, it is difficult to make the reflection characteristic and the transmission characteristic flat with respect to the light in the visible band.

In the half mirror used in the see-through-type HMD, it is necessary to make the transmission characteristic approximately flat with respect to lights in the whole visible band (condition (1)). On the other hand, in the half mirror used in the see-through-type HMD, it is unnecessary to make the reflection characteristic approximately flat with respect to lights in the whole visible band and it is sufficient that the reflection characteristic is made approximately flat with respect to the wavelength band of light which constitutes the image light (condition (2)).

The less the transmission characteristic satisfies the above-mentioned condition (1), the more the brightness and color of scenery lose fidelity so that the scenery is recognized with less fidelity in brightness and color. Further, the less the reflection characteristic satisfies the above-mentioned condition (2), the more a white balance of an image to be displayed by an image light (hereinafter referred to as "display image") is collapsed so that chromaticness of a display image is changed.

In a liquid-crystal-type HMD, the transmission characteristic is required to satisfy the above-mentioned condition (1) in the same manner. However, with respect to the reflection characteristic, the polarization characteristic is fixed and hence, it is sufficient to design the HMD such that the above-mentioned condition (2) is satisfied only with respect to the polarization characteristic corresponding to the wavelength band of light which constitutes the image light whereby the HMD can be relatively easily designed.

However, in a retinal scanning HMD which scans a laser beam whose intensity is modulated in response to an image signal on a retina of a user, the polarization characteristic is not fixed. Accordingly, the conditions (1) and (2) must be satisfied with respect to both the transmission characteristic and the reflection characteristic of a P-polarized light and an S-polarized light and hence, the designing of the HMD becomes difficult. As a result, the mass production and the reduction of manufacturing cost of the HMD become difficult, and there has been a case where an image display with high fidelity is impaired.

Accordingly, it is an object of the present invention to provide an HMD in which a half mirror can be easily formed by stacking a dielectric film and a metal film to a plate-shaped resin member constituting a resin substrate, and the transmission characteristic and the reflection characteristic of the HMD satisfy the above-mentioned conditions (1), (2) respectively leading to the easy and low-cost manufacture of the HMD.

According to one aspect of the present invention, there is provided a head mounted display which comprises: a display part which is configured to reflect an image light corresponding to an image signal on a half mirror included in the display part and to allow an external light to pass through the half mirror thus allowing the image light and the external light to be incident on an eye of the user whereby an image corresponding to the image signal is displayed in a superposed manner with scenery. That is, the display part includes the half mirror which reflects the image light corresponding to the image signal thereon and allows an external light to pass therethrough thus allowing the image light and the external light to be incident on the eye of the user. The half mirror is formed by stacking a dielectric film and a metal film to a plate-shaped resin member. Here, the half mirror is further configured as follows. While reflectivity of a P-polarized light and reflectivity of an S-polarized light do not agree with each other in at least a partial band of a visible band which contains three specified wavelengths which form an image light, the reflectivity of the P-polarized light and the reflectivity of the S-polarized light are set approximately equal to each other with respect to at least the three specified wavelengths. An average value of transmittance of the P-polarized light and transmittance of the S-polarized light with respect to the respective wavelengths in the visible band which contains the three specified wavelengths is suppressed to a value which falls within a regulated range in the whole visible band.

DESCRIPTION

Hereinafter, an HMD according to one embodiment of the present invention is specifically explained in conjunction with drawings. As the HMD according to this embodiment, the explanation is made with respect to a retinal scanning HMD which scans an image light formed of laser beams of respective colors, that is, three primary colors, whose intensities are modulated corresponding to image signals and projects the image light to an eye of a user who is an observer whereby the image light is scanned on a retina of the eye of the user. However, the HMD is not limited to the retinal scanning HMD. For example, the HMD may be an LCD-type HMD which allows light radiated from a light source part to be incident on an LCD (Liquid crystal Display) in which each pixel is constituted of sub pixels of three primarily colors or an LCD which is provided for every color of three primarily colors, and allows the light which passes through or is reflected on the LCD to be incident on an eye of a user. Here, provided that the image signal is a signal (information) for forming an image, a form of the image signal is not limited.

[1. Appearance of HMD 1]

Figure 1:
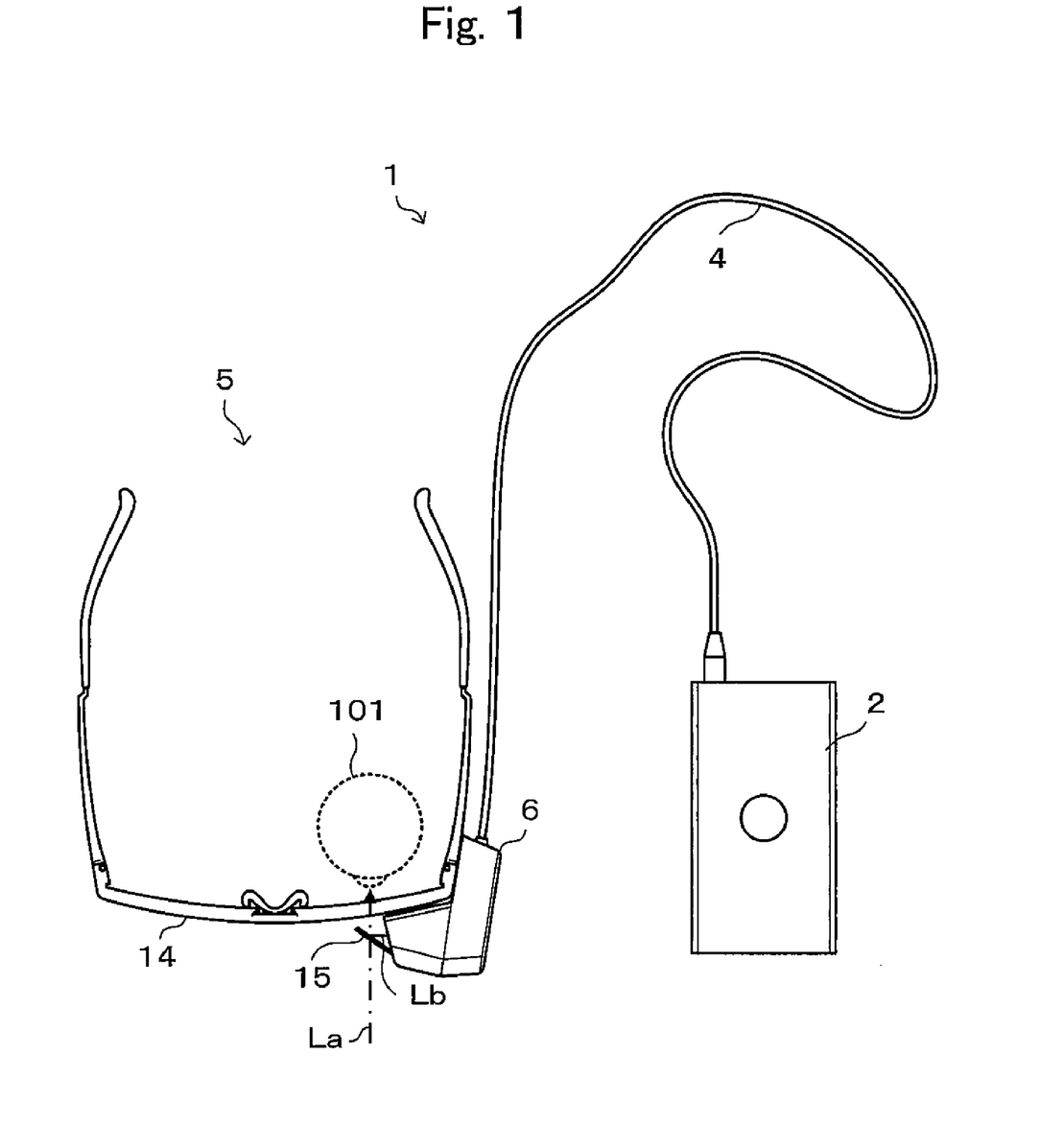
FIG. 1 is a view showing the appearance of an HMD.

As shown in FIG. 1, the HMD 1 according to this embodiment includes a control unit 2 and a head mounting device 5, and the control unit 2 and the head mounting device 5 are connected with each other by way of a transmission cable portion 4. The transmission cable portion 4 includes an optical fiber cable 50 (see FIG. 2) which transmits laser beams radiated from the control unit 2. The transmission cable portion 4 also includes a drive signal transmission cable for transmitting a high-speed drive signal 61 and a low-speed drive signal 62 for making a high-speed scanning part 80 and a low-speed scanning part 90 which are provided to a projection part 6 described later synchronize with a light source part 20 described later.

The control unit 2 forms an image signal S based on content information F which is image information stored in a content memory part 12 described later and incorporated in the control unit 2, and radiates a laser beam (hereinafter, also referred to as "image light") having intensity corresponding to the image signal S to the transmission cable portion 4. Here, it is possible to input image signals, content information and the like to the control unit 2 from external input/output terminals not shown in the drawing. Here, "content information" is constituted of still image data, moving image data or the like which contains a character image, a pattern image or the like.

The head mounting device 5 is constituted of the projection part 6 and an eyeglasses-type frame 14 which supports the projection part 6. The projection part 6 scans image lights transmitted by way of an optical fiber cable 50 of the transmission cable portion 4 in two-dimensional directions and projects the image lights to an eye 101 of a user. Due to such an operation, the image lights are scanned two-dimensionally so that an image is projected on a retina of the eye 101 of the user whereby the user can visually recognize an image corresponding to the image signal S.

Further, the projection part 6 includes a half mirror 15 at a position where the half mirror 15 faces the eye 101 of the user. An external light La passes through the half mirror 15 and is incident on the eye 101 of the user, and an image light Lb radiated from the projection part 6 is reflected on the half mirror 15 and is incident on the eye 101 of the user. Accordingly, the user can visually recognize an image which is formed by superposing the image generated by the image light Lb on scenery generated by the external light La.

In this manner, the HMD 1 is a see-through-type head mounted display which projects the image light onto the eye 101 of the user while allowing the external light to pass therethrough.

[2. Electrical Constitution and Optical Constitution of HMD 1]

Figure 2:
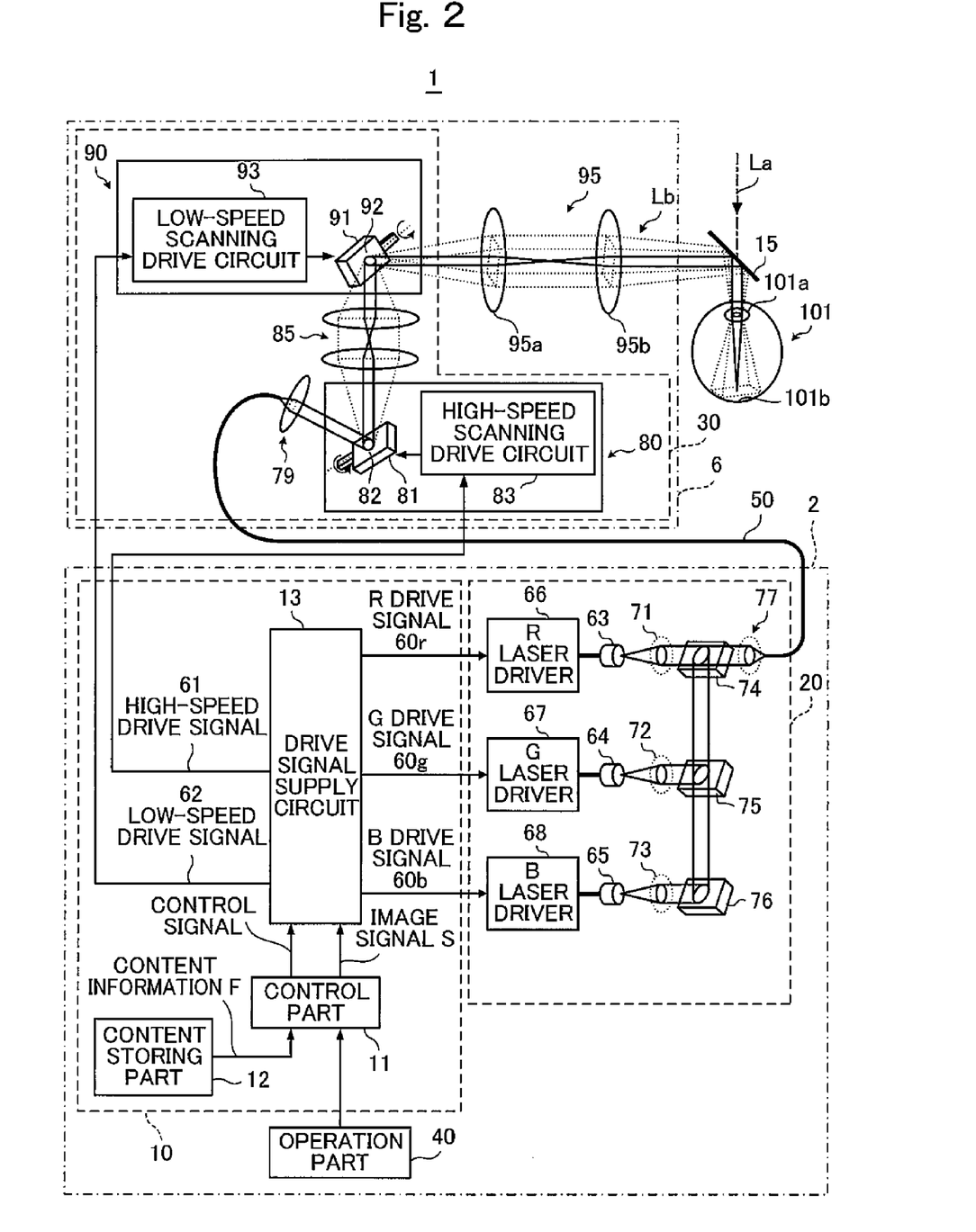
FIG. 2 is a view showing the electrical constitution and optical constitution of the HMD.

Next, the electrical constitution and the optical constitution of the HMD 1 are explained in conjunction with FIG. 2.

The control unit 2 includes a drive control part 10, a light source part 20 and an operation part 40.

The drive control part 10 includes a control part 11 which controls the whole HMD 1, the content storing part 12 which stores content information F, and a drive signal supply circuit 13 which generates signals or the like which constitute elements for forming an image by synthesizing.

The control part 11 includes a CPU, a flash memory, an RAM, a VRAM, a plurality of input/output I/F and the like, and these components are respectively connected to a data communication bus and the transmission and reception of various kinds of information are performed via the bus. The CPU is an arithmetic processing unit which operates the respective parts of the HMD 1 and allows the HMD 1 to perform various functions which the HMD 1 possesses by executing a control program stored in the flash memory. Further, the CPU acquires information inputted from the operation part 40 and executes a treatment corresponding to the information. For example, the CPU converts content information F into a predetermined-type image signal S (for example, an NTSC composite signal, a component signal) based on information inputted from the operation part 40 and outputs the image signal S to the drive signal supply circuit 13.

Based on the image signal S, the drive signal supply circuit 13 generates signals which respectively constitute elements for forming an image for every pixel. That is, the drive signal supply circuit 13 generates and outputs an R (red) drive signal 60*r*, a G (green) drive signal 60*g* and a B (blue) drive signal 60*b* for every pixel. Further, the drive signal supply circuit 13 outputs a high-speed drive signal 61 which is used in the high-speed scanning part 80, and a low-speed drive signal 62 which is used in the low-speed scanning part 90 respectively.

The light source part 20 includes an R laser driver 66, a G laser driver 67 and a B laser driver 68. The R laser driver 66, the G laser driver 67 and the B laser driver 68 respectively supply a drive current to the R laser 63, a G laser 64, and a B laser 65 based on an R drive signal 60*r*, a G drive signal 60*g* and a B drive signal 60*b* which are respectively outputted from the drive signal supply circuit 13. The respective lasers 63, 64, 65 radiate laser beams (also referred to as "optical flux") whose intensities are modulated corresponding to drive currents supplied from the respective laser drivers 66, 67, 68. Each laser 63, 64, 65 may be constituted of a semiconductor laser or a solid-state laser having a mechanism for generating higher harmonics, for example. Here, when the semiconductor laser is used as the laser 63, 64, 65, the intensity of the laser beam may be modulated by directly modulating a drive current. On the other hand, when the solid laser is used as the laser 63, 64, 65, it is necessary to modulate the intensity of the laser beam by providing an external modulator to each laser 63, 64, 65.

Further, the light source part 20 includes collimation optical systems 71, 72, 73, dichroic mirrors 74, 75, 76 for synthesizing collimated laser beams, and a coupling optical system 77. The laser beams radiated from the respective lasers 63, 64, 65 are collimated by the collimation optical systems 71, 72, 73 respectively and, thereafter, the collimated laser beams are incident on the dichroic mirrors 74, 75, 76 respectively. Thereafter, the respective laser beams of three primary colors are reflected on or are allowed to pass through the dichroic mirrors 74, 75, 76 selectively corresponding to wavelengths thereof, arrive at the coupling optical system 77, and are synthesized by the coupling optical system 77. Then, the synthesized laser beams are radiated to the optical fiber cable 50. In this manner, the laser beams which are radiated to the optical fiber cable 50 constitute an image light Lb which is obtained by synthesizing the laser beams of respective colors whose intensities are modulated.

The projection part 6 is arranged between the light source part 20 and the eye 101 of the user, and includes a scanning part 30 and a second relay optical system 95. The scanning part 30 includes a collimation optical system 79, the high-speed scanning part 80, the low-speed scanning part 90, and a first relay optical system 85.

The collimation optical system 79 collimates the laser beams which are generated by the light source part 20 and are radiated through the optical fiber cable 50.

The high-speed scanning part 80 and the low-speed scanning part 90 are optical systems which, to bring the laser beams incident from the optical fiber cable 50 into a state which allows the laser beams to be projected onto the retina 101*b* of the user as an image, scan the laser beams in the first direction as well as in the second direction to form the laser beams into scanned optical fluxes. The high-speed scanning part 80 scans the laser beams which are incident on the high-speed scanning part 80 after being collimated by the collimation optical system 79 in the first direction in a reciprocating manner for displaying an image. Further, the low-speed scanning part 90 scans the laser beams which are scanned in the first direction by the high-speed scanning part 80, and are incident on the low-speed scanning part 90 by way of the first relay optical system 85 in the second direction approximately orthogonal to the first direction.

The high-speed scanning part 80 includes a resonance-type deflecting element 81 having a deflecting surface (reflecting surface) 82 for scanning the laser beams in the first direction, and a high-speed scanning drive circuit 83 which, based on a high-speed drive signal 61, generates a drive signal for resonating the deflecting element 81 so as to swing the deflecting surface 82 of the deflecting element 81.

On the other hand, the low-speed scanning part 90 includes a non-resonance-type deflecting element 91 having a deflecting surface (reflecting surface) 92 for scanning the laser beams in the second direction, and a low-speed scanning drive circuit 93 which generates, based on a low-speed drive signal 62, a drive signal for swinging the deflecting surface 92 of the deflecting element 91 in a non-resonant state. The low-speed scanning part 90 scans the laser beams for forming the image in the second direction toward a final scanning line from a first scanning line for every 1 frame of an image to be displayed. Here, "scanning line" implies one scanning in the first direction performed by the high-speed scanning part 80.

In this embodiment, a galvanometer mirror is used as the deflecting elements 81, 91. However, any one of a piezoelectric drive method, an electromagnetic drive method, an electrostatic drive method and the like may be used as a drive method of the deflecting elements 81, 91 provided that the drive method can swing or rotate the deflecting surfaces 82, 92 so as to scan the laser beams. Further, in this embodiment, the resonance-type deflecting element is used in the high-speed scanning part 80, and the non-resonance-type deflecting element is used in the low-speed scanning part 90. However, the present invention is not limited to such constitutions. For example, the low-speed scanning part 90 may use the resonance-type deflecting element, and both the high-speed scanning part 80 and the low-speed scanning part 90 may use the non-resonance-type deflecting element.

Further, the first relay optical system 85 is arranged between the high-speed scanning part 80 and the low-speed scanning part 90, and relays the laser beams. The first relay optical system 85 converges the laser beams which are scanned in the first direction by the deflecting surface 82 of the deflecting element 81 on the deflecting surface 92 of the deflecting element 91. The converged laser beams are scanned in the second direction by the deflecting surface 92 of the deflecting element 91. The laser beams which are scanned by the deflecting element 91 passes through the second relay optical system 95 in which two lenses 95*a*, 95*b* having a positive refractive power are arranged in series, are reflected on the half mirror 15 positioned in front of the eye 101, and are incident on a pupil 101*a* of the user. Due to such an operation, the laser beams (image light Lb) corresponding to the image signal S are scanned two-dimensionally on the retina 101*b*. Accordingly, the user can recognize the image light Lb which is incident on the pupil 101*a* as an image. The half mirror 15 also allows the external light La to pass therethrough and to be incident on the pupil 101*a* of the user. Accordingly, the user can visually recognize an image which is obtained by superposing the image based on the image light Lb to the scenery based on the external light La.

In the second relay optical system 95, using the lens 95a, the respective laser beams have center lines thereof arranged approximately parallel to each other, and are respectively converted into converged laser beams. Then, using the lens 95b, the converged laser beams are arranged approximately parallel to each other and, at the same time, are converted such that the center lines of these laser beams are converged on the pupil 101a of the user. In this embodiment, a projection part is constituted of the lens 95b and the half mirror 15. Further, in this embodiment, a display part is constituted of the drive signal supply circuit 13, the light source part 20, the optical fiber cable 50, the scanning part 30, the second relay optical system 95, and the half mirror 15.

[3. Constitution of Half Mirror 15]

Next, the constitution of the half mirror 15 which constitutes a technical feature of the HMD 1 according to this embodiment is explained.

Figure 3:
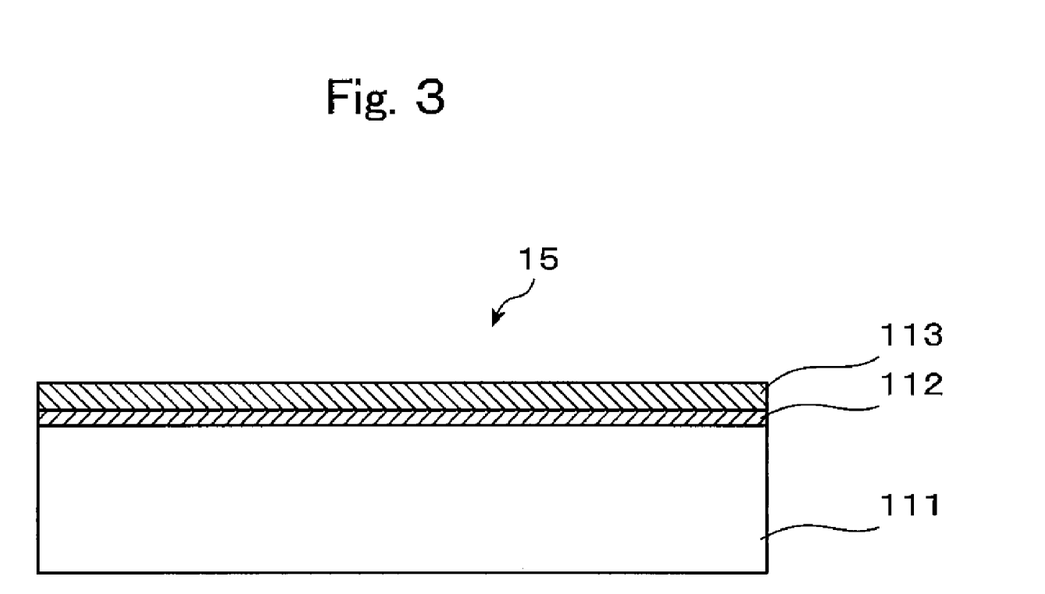
FIG. 3 is a view showing the constitution of a half mirror.

As shown in FIG. 3, the half mirror 15 is formed by stacking a metal film 112 and a dielectric film 113 to a plate-shaped resin member 111 which constitutes a resin substrate. That is, the half mirror 15 is formed by applying a hybrid film which is the combination of the metal film 112 and the dielectric film 113 to the plate-shaped resin member 111 by coating.

As the metal film 112, for example, a film made of Cr, Al, Ag, Au, Ni, $Cr_2O_3$, $Al_2O_3$, Cu, In, Pt, ITO (Indium Tin Oxide) or the combination of these materials may be used. Further, as the dielectric film 113, for example, a dielectric film made of SiO, $SiO_2$, $MgF_2$, $Al_2O_3$, $ZrO_2$, $TiO_2$, $Ta_2O_5$, ZnS or a mixture of these materials or a stacked film formed by stacking two or more films made of these materials may be used.

Figure 4:
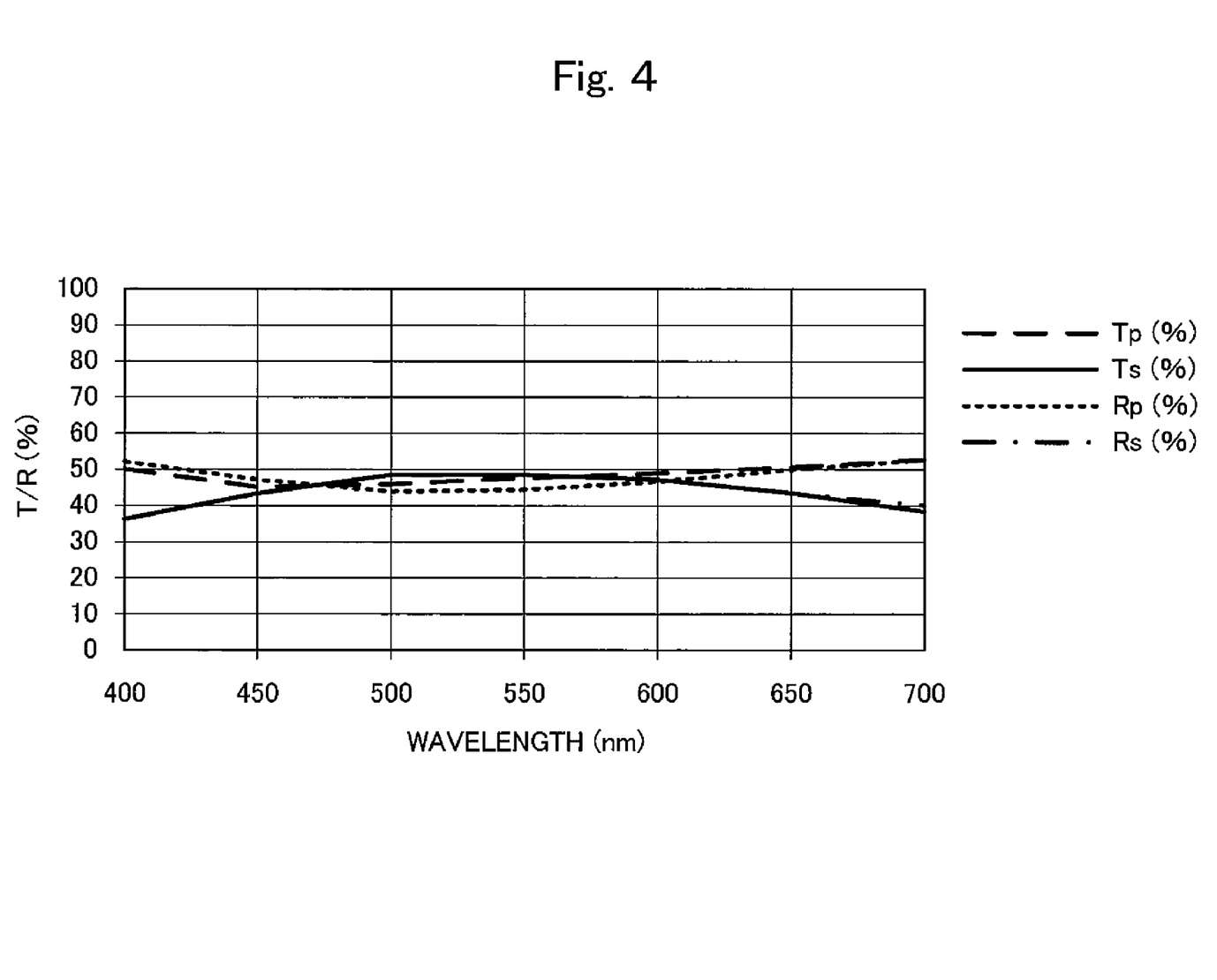
FIG. 4 is a view showing optical characteristics of a conventional half mirror which uses a glass substrate.

In a conventional half mirror which is formed by applying a hybrid film to a glass substrate by coating, a metal film and a dielectric film can be freely combined with each other to form the hybrid film and hence, as shown in FIG. 4, a flat reflection characteristic and a flat transmission characteristic can be realized with respect to light in a visible band. Here, the half mirror is required to exhibit the same reflectivity and the same transmittance with respect to an arbitrary polarized light. When the characteristics of the half mirror with respect to a P-polarized light and the characteristics with respect to an S-polarized light are equal, the characteristics of the half mirror with respect to all polarized light become approximately equal. Accordingly, in the half mirror which exhibits the characteristics shown in FIG. 4, the characteristics are approximately equal to each other with respect to the P-polarized light and the S-polarized light so that the characteristics are approximately equal to each other also with respect to all polarized lights. In the explanation made hereinafter in conjunction with FIG. 4 and other drawings, the transmittance with respect to the P-polarized light is indicated by Tp, the transmittance with respect to the S-polarized light is indicated by Ts, the reflectivity with respect to the P-polarized light is indicated by Rp, and the reflectivity with respect to the S-polarized light is indicated by Rs.

In this manner, the half mirror which uses the glass substrate can realize the flat reflection characteristic and the flat transmission characteristic with respect to the light in the visible band. However, the plate-shaped resin member 111 which constitutes the resin substrate exhibits poor heat resistance compared to the glass substrate. Accordingly, it is difficult to apply a metal film to the plate-shaped resin member 111 by coating such as vapor deposition which requires heating so that it is necessary to increase a film thickness of the dielectric film. In this case, it is difficult to make the reflection characteristic and the transmission characteristic flat with respect to a light in a visible band.

Figure 5:
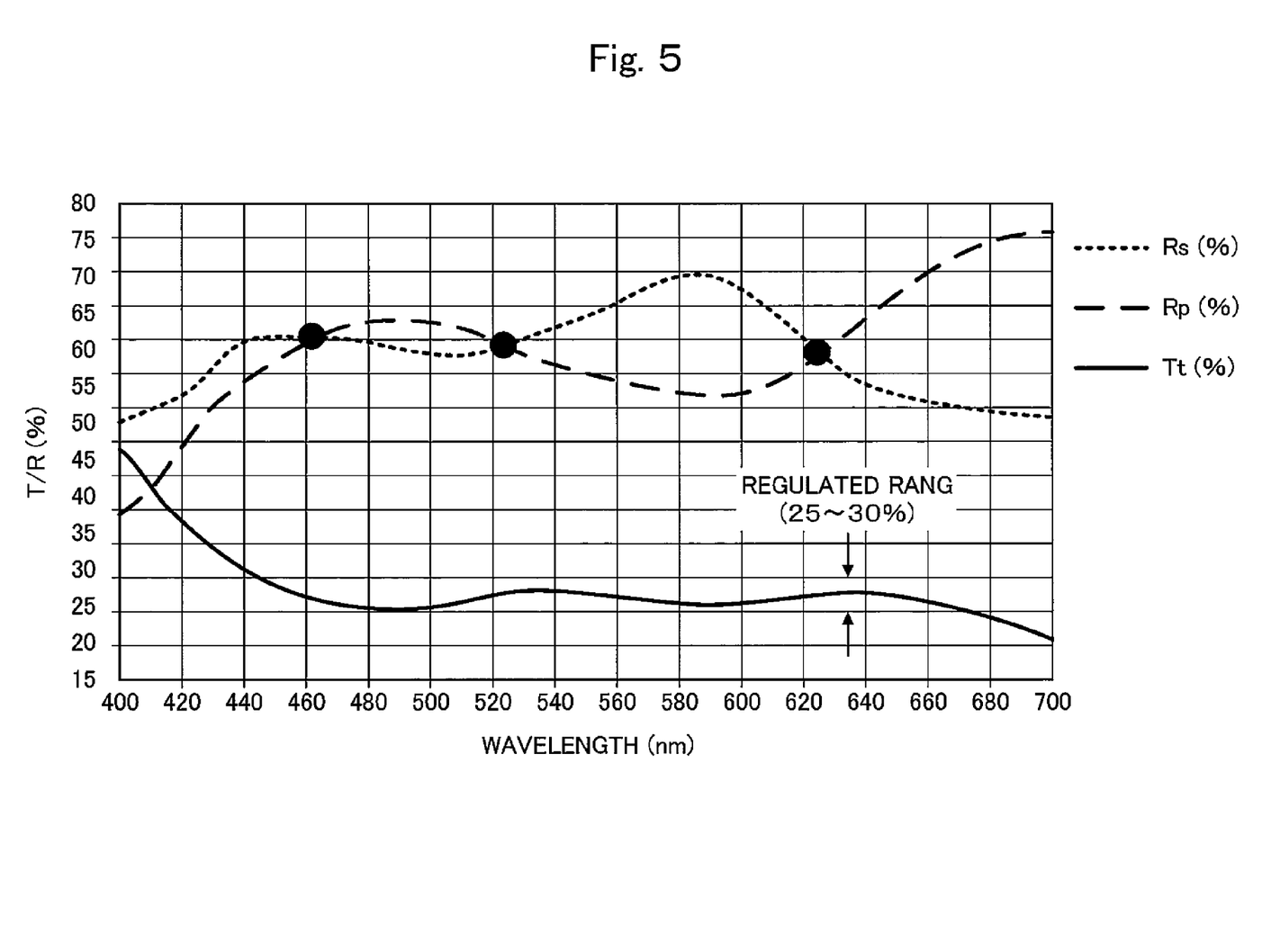
FIG. 5 is a view showing optical characteristics of the half mirror according to this embodiment which uses a resin substrate.

In view of such circumstances, in the half mirror 15 according to this embodiment, by imparting the following transmission characteristic and reflection characteristic to the half mirror 15, it is possible to suppress collapsing of a white balance of a display image formed by an image light while suppressing a phenomenon that the scenery is colored. Further, since the increase of a film thickness of the metal film can be suppressed, it is also possible to suppress a loss of light.

(Transmission Characteristics)

When the transmittance Tp of the P-polarized light and the transmittance Ts of the S-polarized light in the half mirror 15 are equal with respect to the respective wavelengths in the visible band, it is considered that the transmittance is equal with respect to the respective polarized lights so that it is thought that an equal quantity of light passes through the half mirror 15 with respect to the respective wavelengths. However, in the transmission characteristic of the half mirror 15, it is difficult to set the transmittance Tp of the P-polarized light and the transmittance Ts of the S-polarized light of each wavelength equal to each other in the whole visible band.

A natural light contains polarized light components in all directions, and it is considered that the respective polarized light components are approximately equal in the whole visible band. Based on such understanding, in the half mirror 15 according to this embodiment, instead of making the transmittance Tp of the P-polarized light and the transmittance Ts of the S-polarized light of the respective wavelengths equal to each other in the whole visible band, an average value Tt ($=(Tp+Ts)/2$) of the transmittance Tp of the P-polarized light and the transmittance Ts of the S-polarized light with respect to each wavelength in the visible band is suppressed to a value which falls within a regulated range in the whole visible band.

In this manner, by suppressing the average value Tt of the transmittance Tp of the P-polarized light and the transmittance Ts of the S-polarized light with respect to the respective wavelengths in the visible band within a regulated range in the whole visible band, it is possible to suppress the coloring of the scenery.

FIG. 5 shows the characteristics of the half mirror 15 according to this embodiment. As shown in the drawing, with respect to the transmission characteristic of the half mirror 15, the average value Tt of the transmittance Tp of the P-polarized light and the transmittance Ts of the S-polarized light with respect to the respective wavelengths in the visible band from 440 nm to 670 nm is set to the transmittance of approximately 25 to 30% (27.5%±2.5%) in the whole visible band. In other words, the half mirror 15 is configured to exhibit the approximately flat transmittance in the whole visible band such that transmittance varies within a variable range of ±10% in the whole visible band.

In the HMD 1 according to this embodiment, as described later, the reflectivity is set higher than the transmittance such that a user can easily visually recognize a display image formed of an image light. For this end, in the half mirror 15 of the HMD 1, the transmittance is set to 25 to 30% in the whole visible band. However, the transmittance is not limited to such a value. That is, it is sufficient that the transmittance varies within a variable range of ±15% in the whole visible band, and the transmittance may be set to a value which falls within a range from 30 to 40%, for example. However, it is preferable to set the variable range of the transmittance to ±10% in the whole visible band.

In the HMD 1 according to this embodiment, the colors of the laser beams which constitute the image light Lb are three primary colors consisting of R (red), G (green) and B (blue), wherein a wavelength of R (red) is set to 625 nm, a wavelength of G (green) is set to 525 nm and a wavelength of B (blue) is set to 462 nm. The above-mentioned transmission characteristics of the half mirror 15 is set to cover the wavelength of B (blue) which is the shortest wavelength among three primary colors which constitute the image light. That is, the shortest wavelength of the visible band is 440 nm and this wavelength is shorter than 462 nm which is the wavelength of B (blue). By setting the wavelengths of the laser beams in this manner, it is possible to suppress a phenomenon that the scenery is colored and the display image formed by the image light is influenced by the colored scenery.

In the HMD 1 according to this embodiment, the wavelength of B (blue) is set to 462 nm. However, the wavelength is not limited to such a value. For example, the wavelength of B (blue) may be set to 440 nm. Further, although the shortest wavelength of the visible band is set to 440 nm, the shortest wavelength is not limited to such a value. For example, the shortest wavelength of the visible band may be set to 430 nm.

[Reflection Characteristics]

With respect to the image light which the half mirror 15 reflects, there exists a possibility that the polarization characteristic of the image light changes depending on the position of the optical member or the optical fiber cable on the optical path or the irregularities of the characteristics. Accordingly, it is desirable that the reflectivity Rp of the P-polarized light and the reflectivity Rs of the S-polarized light at the arbitrary polarized light with respect to wavelengths of respective colors consisting of R (red), G (green) and B (blue) become equal to each other. In the same manner as the transmittance, when the reflectivity Rp of the P-polarized light and the reflectivity Rs of the S-polarized light are equal with respect to the respective wavelengths, the reflectivity with respect to the respective polarized lights is considered equal so that it is thought that an equal quantity of light is reflected with respect to the respective wavelengths.

Accordingly, in the half mirror 15 according to this embodiment, instead of setting the reflectivity Rp of the P-polarized light and the reflectivity Rs of the S-polarized light equal to each other with respect to all wavelengths in the visible band, the reflectivity Rp of the P-polarized light and the reflectivity Rs of the S-polarized light are set approximately equal to each other with respect to the wavelengths of respective colors consisting of R (red), G (green) and B (blue).

Here, "approximately equal" implies that it is unnecessary to make the reflectivity Rp of the P-polarized light and the reflectivity Rs of the S-polarized light completely agree with each other. That is, assuming the reflectivity Rp of the P-polarized light as "n" and the reflectivity Rs of the S-polarized light as "m", it is sufficient that the relationship of $n \times 0.95 \leq m \leq n \times 1.05$ is satisfied, for example. When such relationship is satisfied, it is possible to suppress a collapse of a white balance of a display image attributed to an image light thus preventing the lowering of quality of the display image.

As described above, it is difficult to set the reflectivity Rp of the P-polarized light and the reflectivity Rs of the S-polarized light equal to each other with respect to respective wavelengths in the visible band. However, according to the half mirror 15 of this embodiment, it is sufficient to set the reflectivity Rp of the P-polarized light and the reflectivity Rs of the S-polarized light with respect to the wavelengths of respective colors consisting of R (red), G (green) and B (blue) approximately equal to each other and it is unnecessary to take other wavelengths into consideration. Accordingly, the half mirror 15 can be manufactured in a relatively easy manner.

In the HMD 1 according to this embodiment, as described above, the wavelength of R (red) is set to 625 nm, the wavelength of G (green) is set to 525 nm, and the wavelength of B (blue) is set to 462 nm. Further, as shown in FIG. 5, in the half mirror 15 according to this embodiment, the reflectivity Rp of the P-polarized light and the reflectivity Rs of the S-polarized light are set approximately equal to each other with respect to 625 nm, 525 nm and 462 nm. Particularly, in the half mirror 15 according to this embodiment, in the visible band which contains the wavelengths of three primary colors consisting of R (red), G (green) and B (blue), while the reflectivity Rp of the P-polarized light and the reflectivity Rs of the S-polarized light are repeatedly and alternately increased and decreased without agreeing with each other in at least a partial band from a low band to a high band of the visible band, the reflectivity Rp of the P-polarized light and the reflectivity Rs of the S-polarized light are set approximately equal to each other at least with respect to the wavelengths of respective three primary colors. Accordingly, for example, by firstly adjusting the half mirror 15 such that the reflectivity Rp of the P-polarized light and the reflectivity Rs of the S-polarized light are alternately increased and decreased from the low band to the high band in the visible band and, thereafter, by adjusting the half mirror 15 such that the reflectivity Rp of the P-polarized light and the reflectivity Rs of the S-polarized light are set approximately equal to each other with respect to the wavelengths of three respective primary colors, the half mirror 15 can be manufactured in a relatively easy manner.

In this manner, in the half mirror 15, by setting the reflectivity Rp of the P-polarized light and the reflectivity Rs of the S-polarized light equal to each other with respect to the wavelength of the image light to be reflected, it is possible to prevent a collapse of a white balance of a display image attributed to an image light.

The half mirror 15 according to this embodiment is formed of a plate-type half mirror without using a prism-type half mirror. This is because the prism-type half mirror has a large prism thickness depending on an angle of view so that when the prism-type half mirror is used in a see-through-type HMD, a user feels discomfort in wearing the HMD. On the other hand, since the half mirror 15 according to this embodiment is the plate-type half mirror which makes use of the surface reflection, it is possible to realize the reduction of thickness of the half mirror 15.

Further, in the HMD 1 according to this embodiment, the wavelength of R (red) is set to 625 nm, the wavelength of G (green) is set to 525 nm, and the wavelength of B (blue) is set to 462 nm. However, the wavelengths of these colors are not limited to the above-mentioned values, and any wavelengths of these colors are applicable to the HMD 1 according to this embodiment. Further, in the HMD 1 according to this embodiment, although the reflectivity Rp of the P-polarized light and the reflectivity Rs of the S-polarized light are set approximately equal to each other with respect to three wavelengths of three primary colors which constitute the image light, an image light may be constituted of light having color of four or more wavelengths, and the reflectivity Rp of the P-polarized light and the reflectivity Rs of the S-polarized light may be set approximately equal to each other with respect to the respective wavelengths which form the image light.

Further, the half mirror 15 is formed by combining the metal film and the dielectric film so that the half mirror 15 can obtain the above-mentioned characteristics. Here, the metal film 112 may be made of a material other than the above-mentioned materials. In the same manner, the dielectric film 113 may be made of a material other than the above-mentioned materials.

As has been described heretofore, the HMD 1 according to this embodiment includes the display part (the drive signal supply circuit 13, the light source part 20, the optical fiber cable 50, the scanning part 30, the second relay optical system 95 and the half mirror 15) which allows the image light Lb corresponding to the image signal S to be incident on an eye of the user together with the external light La whereby in image corresponding to the image light is displayed in a superposed manner with scenery. The display part includes the half mirror 15 which reflects the image light Lb and allows the external light La to pass therethrough thus allowing the image light Lb and the external light La incident on the eye of the user. The half mirror 15 is formed by stacking the dielectric film 113 and the metal film 112 to the plate-shaped resin member 111. The half mirror 15 is further configured as follows. Reflectivity Rp of the P-polarized light and reflectivity Rs of the S-polarized light do not agree with each other in at least the partial band of the visible band which contains three specified wavelengths (R, G, B) which form the image light Lb. The reflectivity Rp of the P-polarized light and the reflectivity Rs of the S-polarized light with respect to at least the three specified wavelengths (R, G, B) are set approximately equal. Further, the average value Tt of transmittance Tp of the P-polarized light and transmittance Ts of the S-polarized light with respect to the respective wavelengths in the visible band which contains the three specified wavelengths (R, G, B) is suppressed to a value which falls within a regulated range in the whole visible band. That is, without making the transmittance Tp of the P-polarized light and transmittance Ts of the S-polarized light equal to each other with respect to the respective wavelengths in the visible band, the average value Tt of transmittance Tp of the P-polarized light and transmittance Ts of the S-polarized light with respect to the respective wavelengths in the visible band is suppressed to the value which falls within the regulated range in the whole visible band. Further, it is sufficient to set the reflectivity Rp of the P-polarized light and the reflectivity Rs of the S-polarized light approximately equal to each other with respect to the three specified wavelengths (R, G, B) of the visible band, and it is unnecessary to take other wavelengths into consideration. Accordingly, the half mirror which is formed by stacking the dielectric film and the metal film on the plate-shaped resin member which constitutes the resin substrate easily satisfies the required reflection characteristic and the required transmission characteristic thus eventually providing the HMD which can be manufactured on a mass production basis at a low cost.

What is claimed is:

1. A head mounted display comprising: a display part which is configured to reflect an image light corresponding to an image signal on a half mirror included in the display part and to allow an external light to pass through the half mirror thus allowing the image light and the external light to be incident on an eye of a user whereby an image corresponding to the image signal is displayed in a superposed manner with scenery, wherein the display part comprises:
a light source part that is configured to radiate laser beams of three specified wavelengths with intensities corresponding to an image signal;
a scanning part that is configured to scan the laser beams radiated from the light source part; and
a projection part that is configured to project the laser beams scanned by the scanning part to a retina of an eye of the user by way of the half mirror as the image light thus projecting an image on the retina, the half mirror is formed by stacking a dielectric film and a metal film to a plate-shaped resin member, and the half mirror is configured such that while reflectivity of a P-polarized light and reflectivity of an S-polarized light do not agree with each other in at least a partial band of a visible band which contains the three specified wavelengths which form the image light, the reflectivity of the P-polarized light and the reflectivity of the S-polarized light are set approximately equal to each other with respect to at least the three specified wavelengths, and an average value of transmittance of the P-polarized light and transmittance of the S-polarized light with respect to the respective wavelengths in the visible band which contains the three specified wavelengths is suppressed to a value which falls within a regulated range in the whole visible band.

2. The head mounted display according to claim 1, wherein a shortest wavelength of the visible band is shorter than the shortest wavelength among the three specified wavelengths.

3. The head mounted display according to claim 2, wherein the shortest wavelength is 440 nm.

4. The head mounted display according to claim 1, wherein the three specified wavelengths are constituted of one wavelength in a red band, one wavelength in a green band and one wavelength in a blue band.

* * * * *